US006478277B2

(12) United States Patent  (10) Patent No.: US 6,478,277 B2
Winquest  (45) Date of Patent: Nov. 12, 2002

(54) SANITARY MOUNT FOR A CONTAINER

(76) Inventor: Richard J. Winquest, 25045 Wintergreen Ct., Newhall, CA (US) 91381

( * ) Notice: Subject to any disclaimer, the term of this patent is extended or adjusted under 35 U.S.C. 154(b) by 0 days.

(21) Appl. No.: 09/728,902

(22) Filed: Dec. 4, 2000

(65) Prior Publication Data

US 2002/0125393 A1 Sep. 12, 2002

Related U.S. Application Data

(60) Provisional application No. 60/180,774, filed on Feb. 7, 2000.

(51) Int. Cl.[7] .............................................. A47B 91/00
(52) U.S. Cl. .................................... 248/346.01; 119/61
(58) Field of Search ............................... 248/519, 916, 248/346.01; 47/40.5; 119/61, 51.5

(56) References Cited

U.S. PATENT DOCUMENTS

| 2,517,332 | A | * | 8/1950 | Mitchell et al. | 248/44 |
| 3,441,003 | A | * | 4/1969 | Du Mont et al. | 119/61 |
| D273,430 | S | * | 4/1984 | Salinas | D30/16 |
| 4,953,506 | A | * | 9/1990 | Sanders | 119/61 |
| 5,031,575 | A | * | 7/1991 | Phillips | 119/61 |
| 5,042,192 | A | * | 8/1991 | Osteen | 43/109 |
| 5,253,609 | A | * | 10/1993 | Partelow et al. | 119/61 |
| D342,352 | S | * | 12/1993 | Embrey | 119/61 |
| 5,431,276 | A | * | 7/1995 | Lialin | 206/222 |
| 5,619,952 | A | * | 4/1997 | Walker | 119/61 |
| 5,794,564 | A | * | 8/1998 | Paro | 119/61 |
| 5,975,016 | A | * | 11/1999 | Wesenhagen | 119/61 |
| 6,065,428 | A | * | 5/2000 | Fronk | 119/61 |

* cited by examiner

Primary Examiner—Ramon O. Ramirez
Assistant Examiner—Kofi A. Schulterbrandt
(74) Attorney, Agent, or Firm—Roger A. Marrs

(57) ABSTRACT

A sanitary mount or stand for a container having a two-component construction with a platform for supporting the container. The platform is detachably connected to a support base which constitutes a barrier interfering with the path of insects which would normally follow a path leading to the contents of the container. The support base includes a circular barrier defined between an outer wall and an inner wall channel which may serve as a moat for holding a quantity of liquid or a sticky substance. The container may include a downwardly depending shoulder or stud and a threaded shank or pin and slot attachment which is wherein engagement of the shoulder with the support base provides a separation between the underside of the food container carrying platform and the support base that cannot be traversed by the insects.

8 Claims, 2 Drawing Sheets

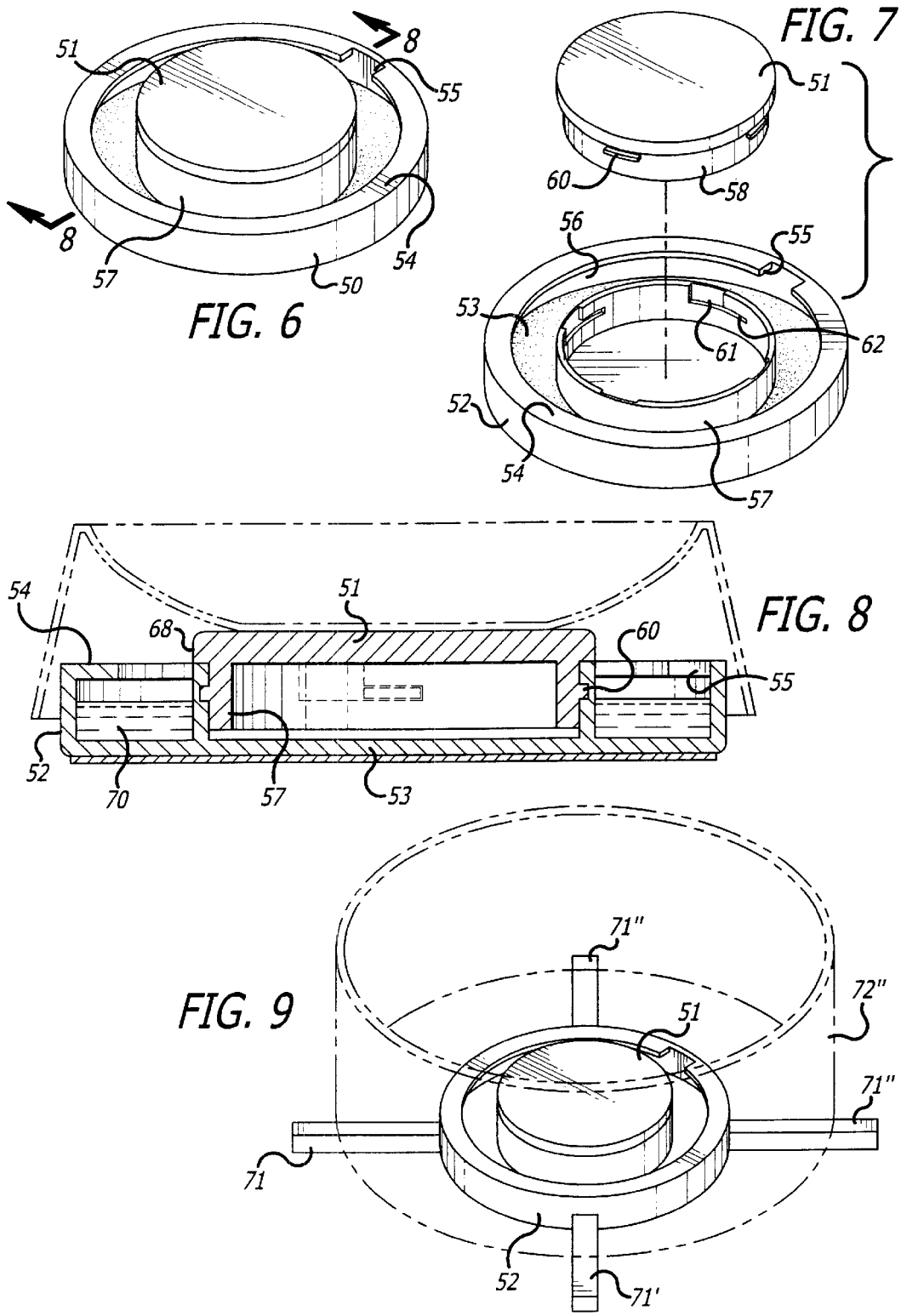

SANITARY MOUNT FOR A CONTAINER

This application claims the benefit of U.S. Provisional application No. 60/180,774, filed Feb. 7, 2000.

BACKGROUND OF THE INVENTION

1. Field of the Invention

The present invention relates to the field of sanitary containers for food dishes, trash barrels or the like, and more particularly to a novel serving mount or platform which includes a two-piece mount wherein a first section contains an insect attracting product such as food and the second section serves as a barrier and contains a moat or sticky substance separating an insect approach path for food, trash or the like in the dish.

2. Brief Description of the Prior Art

In the past, a problem has existed in preventing or blocking the path of insects from gaining access to trash containers or to food set out for an animal or fowl. The food is a normal attraction for insects and unless a barrier of some kind is provided, the insects will contaminate the food and will certainly destroy the value of the food for animal or fowl.

Some attempts have been made to provide feed bowls for animals which include a barrier containing a sticky substance or a liquid moat which is in the path of the insects so that the insects cannot reach the food. An example of such a device is disclosed in U.S. Pat. No. 4,953,506 which is a two-part food bowl wherein the first part for holding the food is detachably connected to a stationary or supporting base. The attachment is by means of a bayonet fitting which includes a retention spring as well as separate washers and plates. Difficulties and problems have been encountered with such prior devices which stem largely from the fact that many separate and individual parts are required and the inclusion of mechanisms such as the spring-loaded bayonet type of attachment assembly requires periodic maintenance and servicing. Furthermore, the excessive number of parts that require assembly to complete the bowl's structure is awkward and many times necessary parts are lost which then renders the entire bowl assembly unusable.

Also, similar problems have been experienced in connection with trash in a barrel or container. Various insect attracting substances are stored in waste baskets, trash barrels and the like which provides an unhealthy environment or atmosphere.

Therefore, a long-standing need has existed to provide a novel sanitary mount and barrier for trash or feed container for separating and isolating a path of travel for insects which would normally lead to attractive substances in the container. Preferably, the container mount is composed of two parts which are readily attached together by simple threaded or pin and slot coupling means so that the entire bowl assembly is composed solely of two components. The dish, bowl, or container may be a part of one of the two components.

SUMMARY OF THE INVENTION

Accordingly, the above problems and difficulties are avoided by the present invention which provides a novel bird or animal feeder which is of a two-component construction having an elevated part in the form of a bowl for holding a quantity of food. The elevated part is detachably connected to a support part which constitutes a barrier interfering with the path of insects which would normally follow a path leading to the food in the elevated bowl. The support portion with the barrier includes a circular channel which may serve as a moat for holding a quantity of liquid or the channel may support a sticky substance. In either instance, insects and the like are prevented from crossing the barrier as they attempt to gain access to the feeding area or food formed in the elevated bowl. The elevated bowl includes a downwardly depending shoulder and threaded shank which is threadably connected to a threaded recess in the support part wherein engagement of the shoulder with the support part provides a separation between the underside of the food bowl and the support part that cannot be traversed by the insects. In one form of the invention, the food bowl is detachably connected to the support part or base by a threaded fastening means.

Therefore, it is among the primary objects of the present invention to provide a novel sanitary food dish which includes a barrier to prevent insects or the like from gaining access to food in a dish.

Another object of the present invention resides in providing a novel sanitary food dish which includes a pair of components which are drawn together by a threaded connection wherein one component receives food to be consumed by an animal or a bird and wherein the other component serves as a support for holding the other component in a fixed position.

A further object resides in providing a food dish for snimals which includes a non-skid surface for supporting the dish on the floor or deck and which is of two-piece construction without the necessity of plates, springs, pins or the like.

Still a further object resides in providing a stablized mount for a trash container which will not topple or tip-over but will prevent insects from gaining access to the interior of the container.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 6 is a front perspective view of another container or bowl mount incorporating the present invention;

FIG. 7 is an exposed perspective view illustrating two-piece assembly;

FIG. 8 is an enlarged transverse cross-sectional view of the sanitary mount shown in FIG. 6 as taken in the direction of arrows 8—8 thereof; and FIG. 9 is a perspective view of the sanitary mount shown in FIGS. 6–8 with a stabilizing means for supporting a trash container.

DESCRIPTION OF THE PREFERRED EMBODIMENT

Figure 1:
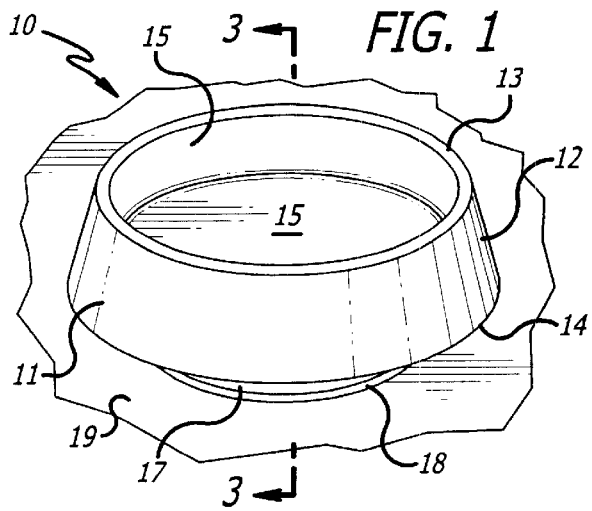
FIG. 1 is a perspective view illustrating the novel sanitary food dish incorporating the present invention.

Referring to FIG. 1, the novel sanitary food dish of the present invention is illustrated in the direction of arrow 10 which includes an elevated bowl 11 having a circular sidewall 12 which flares outwardly from a top edge 13 and terminates in a lower skirt edge 14. The sidewall 12 merges at edge 13 with an inner surface 15 which defines the interior of the bowl in combination with a bottom 16. Food for an animal may be placed into the bowl by placing the food on the bottom 16 within the inner sidewall 15. The elevated bowl 11 is supported on a second component taking the form of a base 17. The base includes a non-skid material 18 which is placed against a supporting surface such as a floor, deck or the like 19.

Figure 2:
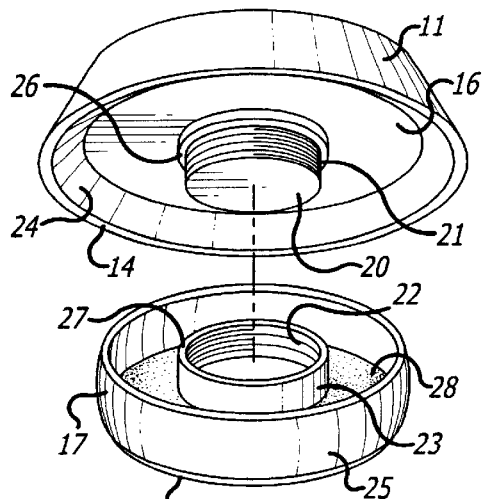
FIG. 2 is an exploded view illustrating the two-piece construction of the food dish shown in FIG. 1.

Referring to FIG. 2, it can be seen that the underside of the elevated part or bowl 11 includes a downwardly depending stud 20 which includes external threads 21 intended to be coupled in threadable engagement with internal threads 22 carried on a collar 23 of the base 17. The underside of the bottom 16 merges with a flared skirt 24 which is of greater diameter than the diameter of a sidewall 25 carried on the base 17. The collar 23 is of sufficient diameter to accept the stud 20 in threadable engagement therewith and a shoulder 26 surrounding the base of the stud 20 with the bottom 16 serves as a stop when engaged with the edge 27 of the collar 23.

It is to be particularly noted in FIG. 2 that the sidewall of the collar 23 is in fixed spaced relationship with respect to the outer wall 25 of the base so as to define a space into which an insect repellant can be placed. A channel is formed between the external surface of the wall 23 and the internal wall surface of the wall 25 into which water may be placed or, as illustrated, a sticky substance 28. The elevated part or bowl 11 is removable from the base so that access may be had to the channel for placing a supply of insect repellant or barrier material within the channel. The substance or repellant may be checked periodically for freshness and for effectiveness.

Figure 3:
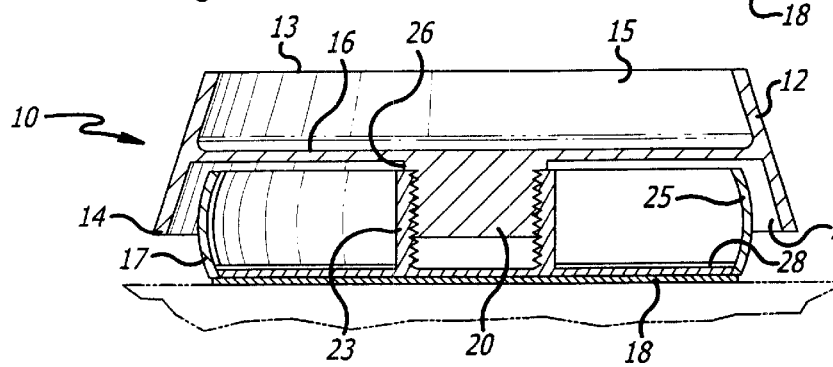
FIG. 3 is a transverse cross-sectional view of the food dish shown in FIG. 1.

Referring now in detail to FIG. 3, it can be seen that the elevated part or bowl 12 may be attached to the support base 17 by the threaded engagement of stud 20 with the collar 23. It is also noted that the inside wall surface of wall 25 is in spaced-apart relationship with respect to the external wall surface of the collar 23 so that a channel or space is defined therebetween for receiving insect barrier or repellant material such as the sticky substance 28. It can also be seen in FIG. 3 that the shoulder 26 engages with the edge 27 of the collar 23 which forms a stop or limit with respect to the mounting of the first component bowl onto the base 17. The stop provides a sufficient distance between the underside or bottom 16 of the bowl 112 with respect to the top edge of wall 25. The spaced-apart distance is sufficient to prevent passage or transit of insects from the wall 25 to the skirt 24 or the bowl bottom 16. If desired, the stud 20 may be made of sufficient length so that it will engage with the bottom of the base 17 to form a stop so that a sufficient space is available between the opposing edges as previously defined.

Figure 4:
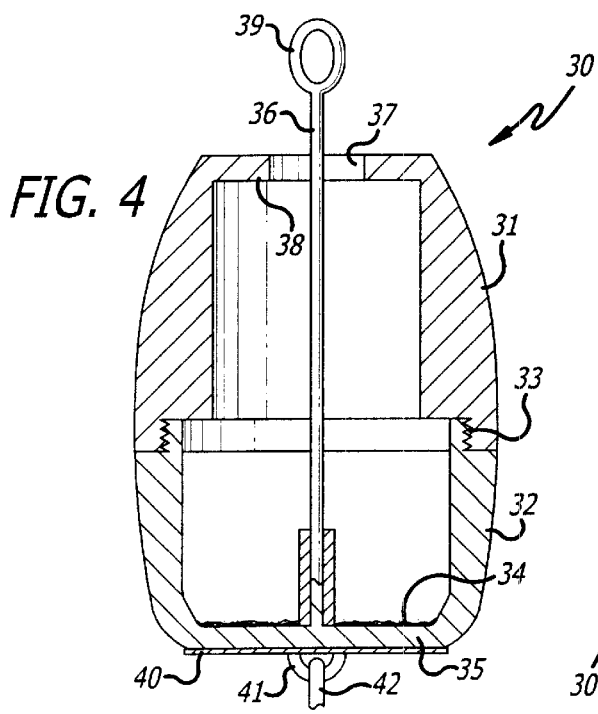
FIG. 4 and FIG. 5 are sectional view and bottom view respectively of another embodiment of the present invention.
Figure 5:
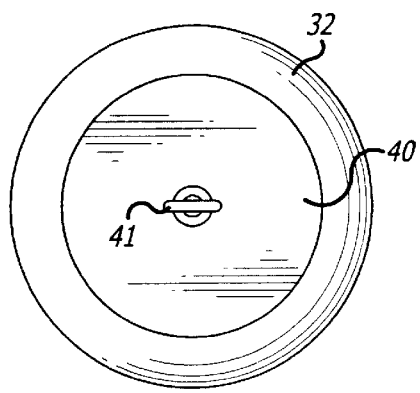

Referring now in detail to FIGS. 4 and 5, another version of the invention is provided wherein a hanging barrier is indicated in the general direction of arrow 30 which comprises a top or upper portion 31 which is detachably engageable with a lower or bottom portion 32 by means of threaded connection 33. A sticky substance 34 may be provided on a bottom 35 of the lower portion or part 32 which will act as a barrier to prevent insects or the like from traveling from a hanging shaft 36 across the bottom to the sidewall of the lower portion 32. It is to be particularly noted that the length of the hanging shaft 36 is in spaced-apart relationship with respect to upper part 31 or lower part 32 and that the shaft passes through an aperture 37 in sufficient spaced-apart relationship so that insects cannot cross or travel therebetween. The opening is defined by an annular member 38 which may serve as a block or barrier should children or anyone try to place their fingers through the opening. A loop 39 is provided on the extreme end of the shaft 36 so that attachment may be made for hanging from an overhead structure. Also, the bottom 35 includes a mounting plate 40 from which a loop 41 downwardly depends and which serves as an attachment for a hook or the like 42 from which a food dish or tray can be suspended.

It is to be particularly noted that the end of shaft 36 opposite to its end carrying the loop 38 is integrally connected with the bottom 35. Internal of the upper portion 31 and the lower portion 32, there is provided sufficient space so that a moat may be defined in the lower part 32 so that water or other repellant may be replaced other than the sticky barrier 34. Therefore, the device 30 is a barrier to prevent passage of insects or the like which may come down the shaft 36 in an attempt to reach food that is hanging from a tray or dish from loop 41 and hook 42.

In view of the foregoing, it can be seen that the sanitary food bowl shown in FIGS. 1–3 or the barrier shown in FIGS. 4–5 will prevent insects or the like from reaching food which is either supported on the base in the case of the bowl 10 in an elevated dish 12 or downwardly depending from the barrier 30 in a suspended form.

FIGS. 6–8 illustrate another embodiment of the inventive concept which includes a circular base 50 with a detachable platform 51 on which a trash or food container is placed. Preferably, the exposed surface of the platform may include an anti-skid or anti-slip surface material. The base includes an upright vertical sidewall 52 supported on a bottom 53 and terminating at its upper edge in an inwardly projecting lip or flange 54. A spill slot or opening 55 is provided in the lip 54 for accommodating spillage or overflow of liquid placed in a moat 56. The moat is defined between the inner surface of outer wall 52 and the outer surface of an inner wall 57. The space defined therebetween establishes the moat which may be filled with an insect repelling liquid or may be occupied by a sticky substance.

The platform 51 includes a downwardly depending collar 58 having a diameter for fitting snugly into a cavity defined by the inner wall 57. Elongated elements 60 fixed on the collar are insertably received within receptacles 61 provided in the inner wall 57 and releasably locked or retained therewith by rotating the platform so that the elements 61 slide into elongated slots 62 formed with each receptacle 61.

Assembly is illustrated in FIG. 8 with the elements residing in the slots to retain the platform on the base. The base has a peripheral flange 68 which extends beyond the collar 58 to rest over the terminal edge of inner wall 57. A barrier of liquid is indicated by numeral 70. An anti-skid frictional pad is secured to the underside of the bottom 53.

FIG. 9 illustrates the sanitary mount having stabilizing legs 71 carried on the outer sidewall 52 in cooperation with the bottom 53. The legs are radially disposed outwardly in fixed, spaced-apart relationship. A trash container 72 is placed on the platform 51.

It is noted that the collar and the inner wall are circular with a wide diameter to provide stability necessary to avoid tipping of the container and mount. Also, the dish, bowl or container may be affixed to the platform by sonic welding, hook and pile fastening components, adhesive or the like.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A sanitary support for a container comprising:

a support base having an outer wall and an inner wall in coaxial, spaced-apart relationship to define a continuous insect barrier therebetween;

a flat platform detachably carried on said support base and said flat platform having a flat circular surface terminating in a peripheral flange defining an edge marginal region extending over said inner wall and terminating short of said insect barrier and short of said outer wall;

said flat platform further having a downwardly depending collar connectable with said inner wall;

said inner wall being the sole support of said flat platform and said edge marginal region of said peripheral flange entirely separated from engagement or contact with said insect barrier;

a tongue and groove attachment means cooperating between said collar and said inner wall to releasably retain said flat platform on said support base; and said collar having an outer surface carrying at least one projection and said inner wall having an inside surface with at least one groove to insertably receive and couple with said projection.

2. The sanitary support defined in claim 1 wherein:

said inner wall is provided with a central opening defined by said inside surface adapted to insertably receive said collar in mated and conformal relationship.

3. The sanitary support defined in claim 2 wherein:

said flat platform circular surface and said inner wall have an identical and equal diameter.

4. The sanitary support defined in claim 3 including:

an anti-skid material carried on an undersurface of said support base; and an anti-skid texture carried on said platform surface.

5. The sanitary support defined in claim 4 including:

a plurality of outwardly radiating members attached to said support base for stabilizing said support base.

6. A sanitary support for a container comprising:

a container having a flat bottom;

a circular base having an insect barrier defined between opposing surfaces of an inner wall and an outer wall with said outer wall and said inner wall being coaxially disposed with respect to each other;

a flat platform detachably connected to said base and having a flat attachment surface engageable with said flat bottom of said container;

said flat surface of said flat platform having an outside given diameter equal to a given outside diameter of said inner wall;

said flat platform having a downwardly depending circular collar with a given outside diameter equal to a given inside diameter of said inner wall; and a tongue and groove fastening arrangement cooperatively engageable to detachably couple said collar with said inner wall.

7. The sanitary support defined in claim 6 wherein:

said flat platform is totally carried on said inner wall with a peripheral edge terminating at said given outer diameter of said inner wall.

8. The sanitary support defined in claim 7 including:

an adhesive layer joining said flat bottom of said container with said flat surface of said flat platform.

* * * * *